July 30, 1968     W. G. TAPPLY ET AL     3,395,384
COOPERATIVE RADAR AND REFLECTOR SYSTEM
Filed Feb. 21, 1967            2 Sheets-Sheet 1
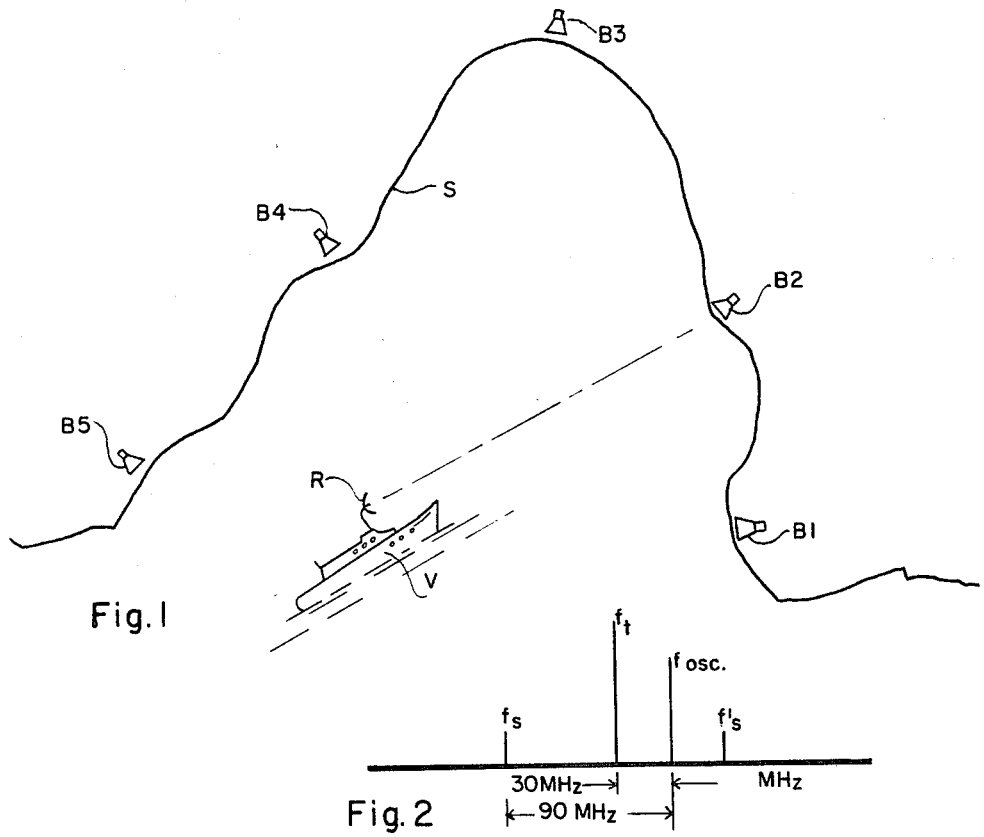
Fig. 1
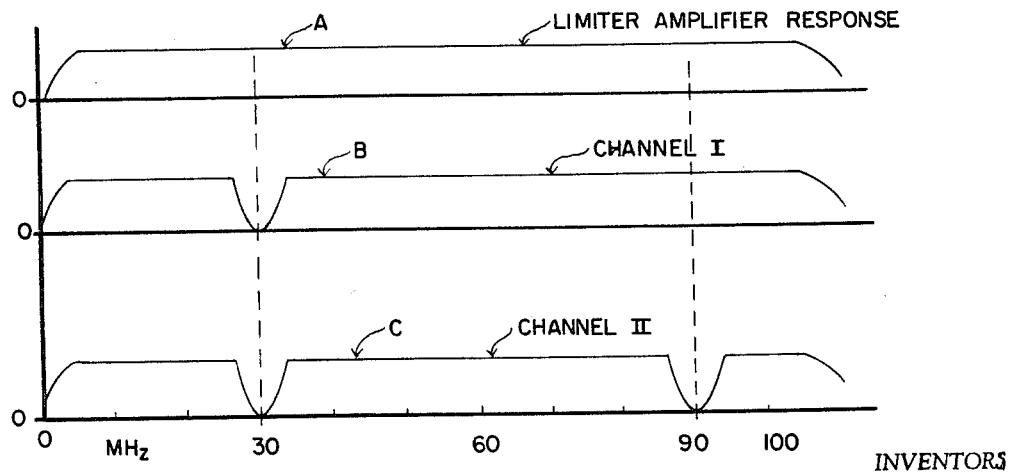
Fig. 2
Fig. 3
INVENTORS
WILLIAM G. TAPPLY
LEWIS MICHNIK
PAUL R. EDLICH
BY *Alexander & Dowell*
ATTORNEYS

INVENTORS
WILLIAM G TAPPLY
LEWIS MICHNIK
PAUL R. EDLICH

BY *Alexander & Dowell*
ATTORNEYS

United States Patent Office 3,395,384
Patented July 30, 1968

3,395,384
COOPERATIVE RADAR AND REFLECTOR SYSTEM
William G. Tapply, West Seneca, Lewis Michnik, Buffalo, and Paul R. Edlich, Orchard Park, N.Y., assignors to Sierra Research Corporation, a corporation of New York
Filed Feb. 21, 1967, Ser. No. 617,552
8 Claims. (Cl. 343—6.5)

ABSTRACT OF THE DISCLOSURE

A radar system for cooperating with one or more remotely located frequency-shift reflectors and capable of displaying a combination of ordinary surface reflections plus frequency-shifted beacon reflections, or either to the exclusion of the other; the combination of the above system including means for guarding surface reflection responses returning at the transmitted radar frequency from all interfering noise signals occurring at other frequencies including the shifted beacon reflection frequency; and further including means for guarding the shifted beacon reflection response returning at the beacon frequency from all noise signals occurring at other frequencies including surface reflections at the radar frequency; both of said guarding actions being independently performed by separating the various received signals, examining their spectra to determine their instantaneous signal and noise levels and selectively gating off the responses during intervals when the noise components exceed a preset threshold level, and then selectively recombining the guarded signals at an indicator unit.

---

This invention relates to a cooperative radar and reflective beacon system in which special measures are taken to provide substantially interference-free reception of surface reflections at the radar frequency and interference-free reception of beacon reflections at a frequency which differs from the radar frequency by a shift increment introduced by the beacon reflector for the purpose of making its reflected return distinguishable from non-beacon surface reflections arriving at the radar receiver. The invention teaches a system for receiving both types of reflections simultaneously, even though a beacon reflection signal might appear to the system to be spurious since it is off the transmitted radar frequency, and a surface reflection might appear spurious to a radar receiver tuned to receive beacon reflection signals.

The present invention is based upon the combination of frequency-shift reflector means (for example as shown in Chisholm Patents 3,108,275 or 3,158,862) with an ordinary pulse-echo radar system which is then modified to the extent of adding spurious-signal eliminating means of the general type disclosed in Chrisholm 3,218,556, or in Michnik and Tapply pending application Ser. No. 603,865, filed Dec. 22, 1966. The four disclosures referred to by number in this paragraph are assigned to the assignee of the present disclosure.

These spurious-signal eliminating means examine the spectra of incoming signals and gate off the receiver whenever the total spurious energy around the desired passband frequency exceeds a certain level. In ordinary pulse radar systems, many spurious pulses are received, but they usually do not exactly coincide timewise with desired pulse signals. Therefore if the receiver is gated off during strong spurious pulse durations, comparatively few desired pulses will be lost over a period of time and their isolated loses will tend to be on a purely random basis. Although true in the usual case, this situation does not hold true in the case of the present beacon reflections. For instance, the frequency shift reflectors disclosed in Patents 3,108,275 and 3,158,862 comprise in the present illustrative embodiment passive reflectors whose reflectivity is chopped at a rate of 60 mHz. Now if a reflector is mounted on a building or cliff, a remote radar will see a strong ordinary surface reflection coinciding precisely in time with a relatively weak frequency-shifted beacon reflection. It is therefore apparent that a receiver tuned to the beacon frequency, and equipped with a noise elimination device to gate the receiver off whenever a non-beacon frequency is received, will be incapable of ever receiving the beacon reflection, the latter being a mere side-band of the main radar frequency chopped at the 60 mHz. rate.

It is a principal object of this invention to provide an improved radar receiving system having separate paths for the main radar reflection signals and for the frequency-shifted beacon signals, and each path being guarded against all other signals lying outside its selected pass frequency.

It is another object of this invention to provide means for selecting and for recombining the outputs of said paths, respectively representing only surface reflections and only beacon reflections, whereby either type of reflection can be viewed alone, or both can be superimposed at the same indicator unit with separately controllable intensities. This is particularly desirable for navigation purposes since navigation is customarily carried on using all available aids simultaneously, and it is reassuring to see the topographic outline superposed on beacon response patterns to be sure that the beacon being viewed is actually in the location on land which has been assumed by the navigator.

Still another very important object of the invention is to provide a radar system capable of receiving and displaying beacon and surface reflection signals which are virtually noise-free.

Other objects and advantages of the invention will become apparent during the following discussion of the drawings, wherein:

FIG. 1 is an illustrative diagram showing a ship using the present radar system to approach an inlet having the illustrated shoreline and having five beacon reflectors disposed at certain points thereon;

FIG. 2 is a diagram illustrating the frequencies of certain signals employed in the radar and reflector system according to the present invention;

FIG. 3 is a graphical presentation showing the bandwidths of the two limiter-amplifiers used in the radar system, the passband of one noise elimination channel, and the passband of the other noise elimination channel.

Figure 4:
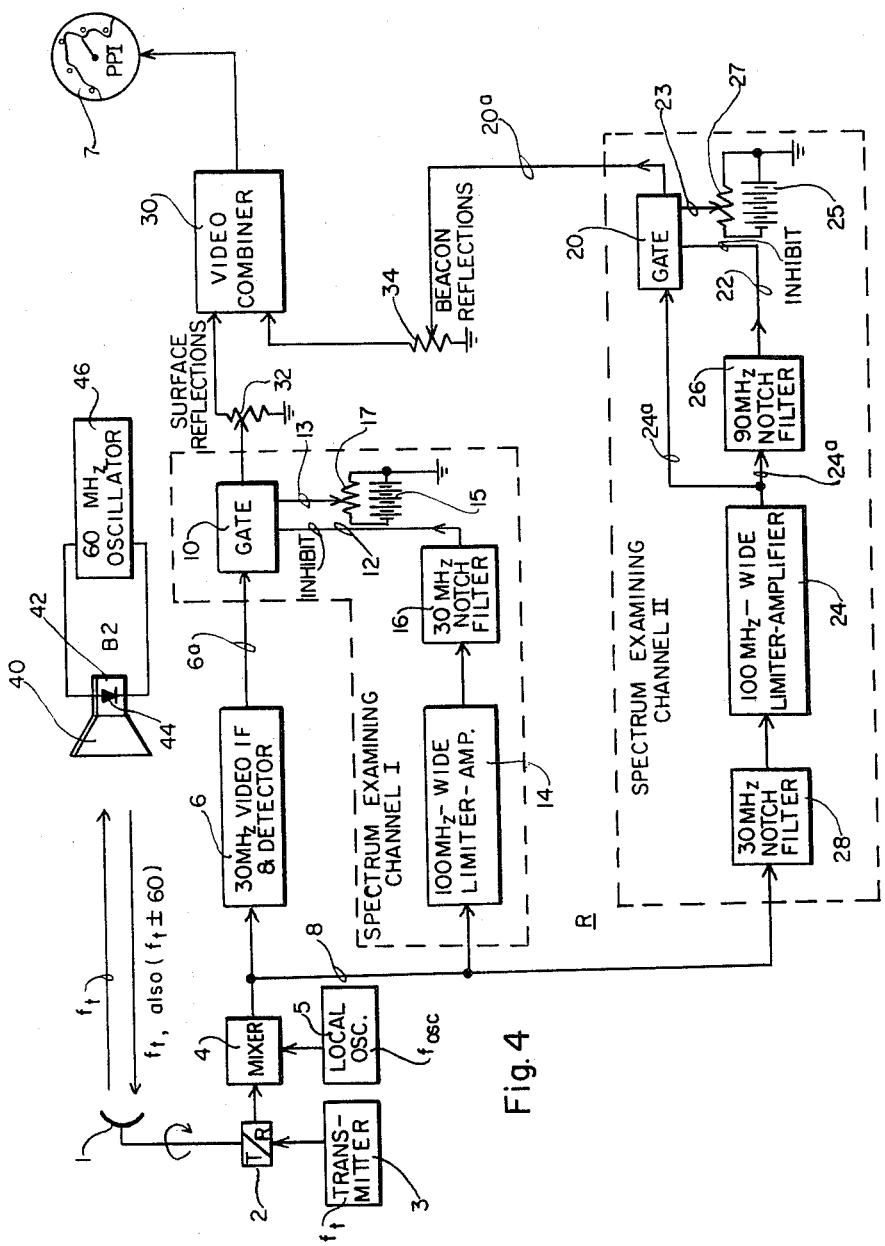
FIG. 4 is a block diagram of the present system including the radar and display, the noise elimination channels, and one of the beacon reflectors.

Referring now to the drawings, FIG. 1 shows a shoreline S having a plurality of reflector beacons B1, B2, B3, B4, and B5 fixed at surveyed shoreline locations and each capable of reflecting a portion of the energy delivered to it by a radar R located aboard a vessel V. As illustrated in FIG. 2, the radar R transmits at a a frequency $f_t$ and receives ordinary surface reflections at the same frequency, the radar including a local oscillator which beats a frequency of $f_{osc}$ against the frequency $f_t$ to produce an I.F. frequency, for instance at 30 mHz. The beacon reflectors B are passive to the extent that they merely reflect most of the incident radar energy back toward the radar in unchanged condition, but in addition each beacon reflector B also includes a small oscillator periodically short-circuiting its reflectivity as set forth for instance in the above-mentioned Chisholm patents, and thereby introducing side-band reflected energy. The amount of frequency shift in the present illustrative example is 60 mHz, and it is an important object of the present invention to be able to receive one of these side bands to the selective exclusion of any other incoming signals so that beacon reflectors can be positively identified by being uniquely displayed on the radar indicator unit.

FIG. 4 shows the block diagram of an illustrative system including a radar R and the beacon reflector B2. The radar includes a directional scanning antenna 1 connected through a T/R box 2 to a transmitter 3 and a receiver mixer 4, the mixer in turn being coupled to a local oscillator 5. The mixer 4 is connected through a 30 mHz. I.F. strip 6 including a detector whose output can be displayed upon an indicator unit 7 comprising a PPI in the present example. These components 1 through 7 comprise the main parts of a standard search radar to which the following novel components have been added.

The standard radar discussed above is augmented according to the present invention by the addition of two spectrum examining channels, I and II each of which is capable of inhibiting an associated gate circuit to prevent the display on the indicator unit 7 of reflections within the passband of that particular channel whenever the examined spectrum contains noise above a certain level. In particular, channel I serves to inhibit the display of ordinary surface reflections when the noise level is too high, and channel II serves to inhibit display of frequency-shifted beacon reflections when accompanied by excessive noise. Channel I is essentially the same as the auxiliary channel shown in Chisholm Patent 3,218,556, or in pending application Ser. No. 603,865, supra. This channel includes a gate 10 which is interposed between the output 6a of the radar receiver and the PPI 7. It is to be assumed that the gate 10 is normally conductive, but can be blocked by an output on inhibit wire 12. The output on wire 12 is obtained by examining the spectrum of all signals delivered at the output of the mixer 4 on wire 8 to establish the relative magnitudes of the desired signal component at the frequency $f_t$ as compared with the instantaneous magnitude of undesired signal components. Various ways of accomplishing this purpose are available as can be seen by comparing the illustrative hardware disclosed in Chisholm 3,218,556 with the illustrative hardware disclosed in the above-mentioned application Ser. No. 603,865. The present illustrative example resembles the latter circuitry, and includes a limiter-amplifier 14 designed to pass frequencies displaced on both sides of the desired 30 mHz. I.F. frequency at which desired signals will appear on wire 8. The limiter-amplifier's passband is indicated in curve A of FIG. 3, showing that this amplifier passes both desired signal components and a wide spectrum of other signals appearing on both sides thereof. Channel I also includes a 30 mHz. notch filter 16 which when coupled with the limiter-amplifier 14 provides a response curve for channel I as shown in FIG. 3B. In other words, the output on wire 12 can contain all frequency components in the vicinity of, but excluding 30 mHz.

The wide band limiter-amplifier 14, and the corresponding limiter-amplifier 24 in channel II both comprise a large number of high gain amplifier stages coupled in cascade such that any input signal above a certain minimum level will saturate at least some of the stages, and thereby provide an output having a fixed saturation amplitude. As is well-known in the amplifier art, the largest signal in a saturated amplifier momentarily blocks out all signals of lesser amplitude. Therefore, the output from the limiter-amplifiers 14 and 24 will comprise either a desired signal output, or a spurious signal amplitude output depending on which input signal is the larger. Usually, the input signals will all be pulse signals of brief duration, and therefore the output will be saturated pulses each one of which represents a desired signal component or an undesired noise component. These output signals from the limiter-amplifier are then delivered to a notch filter.

Still discussing channel I, the saturated output signals from the limiter-amplifier 14 are delivered to a 30 mHz. notch filter 16. If the instantaneous output signal is a desired signal, meaning that it is centered about the 30 mHz. I.F. frequency, then the notch filter 16 will not pass it and no output will appear on the inhibit wire 12. This means that a good strong desired signal is present on wire 8, and there is momentarily no spurious signal of overriding magnitude. This signal then passes through the gate 10 toward the indicator unit 7. On the other hand, if the output of the limiter-amplifier 14 is instantaneonsuly stronger in undesired components, the non-30 mHz. spurious component will pass through the notch filter 16 and develop an inhibit signal on wire 12 to block the gate 10. In the event that there is no strong signal component whatever appearing at the output of the mixer on wire 8, a less-than-saturated instantaneous level may appear on wire 12 representing receiver noise, but at such a low level that there is no need to block the gate 10. For this reason, a threshold comparison voltage is fed to the gate 10 on wire 13. This voltage is obtained from a battery 15 and a potentiometer 17 connected thereacross to permit adjustment of the threshold level appearing on the wire 13. This level is merely a small forward bias placed upon the gate 10 which must be overcome by the inhibit level on wire 12 before the gate will be blocked thereby. Adjustment of the potentiometer 17 serves to determine how much noise must be present at the input to channel I before it is desirable to block the gate 10.

A combining circuit 30 receives both input video signals and superimposes them for display on the indicator unit 7. Two potentiometers 32 and 34 are provided to adjust the video input levels independently of each other so that either can be displayed to the exclusion of the other, or so that both may be simultaneously displayed at relatively adjustable intensities. The output from the main radar I.F. detector 6 through the gate 10 is delivered to the potentiometer 32 which adjusts the intensity of the displayed surface reflections.

In the absence of channel II, the radar system would be incapable of displaying beacon reflections per se. As pointed out above, the frequency-shifted beacon reflection returns are always small in amplitude as compared with the simultaneously received but unshifted reflections at frequency $f_t$. Therefore, the unshifted reflections would always block out the shifted reflections $f_s$ because of saturation within the limiter-amplifier 14. In other words, as far as channel I is concerned, the shifted reflections $f_s$ are off-frequency and would be treated as undesired noise components. Therefore, channel II has been added for the purpose of providing frequency-shifted beacon reflections to the display A 30 mHz. notch filter is interposed between the wire 8 and the limiter-amplifier 24 for the purpose of removing from the input to this limiter-amplifier all unshifted signals appearing at the 30 mHz. I.F. frequency, including ordinary surface reflection signals from the topography as well as from the beacon reflectors themselves, which as stated above reflect more unshifted energy than frequency-shifted energy.

As can be seen in FIG. 3, the response curve C for channel II signals is therefore provided with a notch at 30 mHz. so that the output of the limiter-amplifier 24 can include only frequency-shifted signals $f_s$ and $f'_s$ plus noise components. This output appears on wire 24a and is delivered to two destinations, namely the normally conductive gate 20 and a 90 mHz. notch filter 26. The portion of the output on wire 24a which is delivered to gate 20 represents frequency-shifted beacon responses, but as is also the case in connection with the output on wire 26a these beacon responses may be accompanied by large noise components. In the latter event, it is desirable to temporarily block the gate 20 so as to prevent over-riding noise signals from appearing on the wire 20a when the noise level is excessive, or when there are no beacon response signals present.

As previously described in connection with the limiter-amplifiers 14 and 24, it is a characteristic of their performance that the instantaneously largest signal saturates the amplifier and blocks out all smaller input signals. Therefore, the instantaneous output signals on wire 24a will either represent an amplified beacon response signal or a strong noise component. The 90 mHz. notch filter receives the saturated signal on wire 24a and removes from it the 90 mHz. beacon response signal. Therefore, the output on wire 22 represents nothing but noise components, due to the fact that the response curve shown in FIG. 3C has notches serving to remove both the 30 mHz. and 90 mHz. significant signals components. If the noise component on wire 22 is of sufficient amplitude, it blocks the gate 20 momentarily until the noise component on wire 22 falls below the threshold level established at the gate 20 by a voltage appearing on wire 23 from potentiometer 27 connected across battery 25. As discussed above in connection with gate 10, the threshold level voltage appearing on wire 23 represents a small forward bias on the gate 20 which must be overcome by the inhibit signal on wire 22 before the gate 20 will be blocked.

To aid in understanding of the present embodiment, assume that the main transmitter frequency $f_t$ of the radar is 5600 mHz., and that its local oscillator frequency $f_{osc}$ is 5630 mHz. Also assume that each beacon B represents a small microwave horn 40 having a short wave-guide section 42 of such length as to provide excellent reflectivity of incident energy at the proper wavelength. The waveguide section 42 has a diode 44 connected thereacross in a position to short-circuit the waveguide 42 when the diode is conductive. Therefore, incident energy at frequency $f_t$ will result in reflection to the radar of energy at frequency $f_t$, and also side-band energy at $f_t$ plus or minus 60 mHz., resulting in side bands $f_s$ and $f'_s$. Thus, as shown in FIG. 2 by differencing the oscillator frequency $f_{osc}$ with respect to all of the received energy, one can obtain a 30 mHz. signal representing skin reflections and a 90 mHz. signal representing the difference between the local oscillator frequency of 5630 mHz. and the lower side band $f_s$ which is equal to 5540 mHz. and it is this shifted side band frequency which provides the 90 mHz. video signal to the potentiometer 34 representing nothing but beacon reflections.

Thus, the present illustrative example provides separately adjustable surface reflection signals and shifted beacon reflector signals, both of which signals are guarded against significant noise by their respective spectrum examining channels I and II.

The present invention is not to be limited to the exact form shown in the drawings, for obviously changes may be made therein within the scope of the following claims.

We claim:
1. A radar system for cooperating with remotely located beacons wihch include means for shifting energy arriving at the transmitted radar frequency and re-emitting signals at shifted frequencies, comprising:
  (a) transmitter, receiver and display means;
  (b) a first channel connected to receive signals from the receiver means, and including first gate means for coupling said signals to the display means, and including means for comparing the relative strengths of signals representing the transmitted radar frequency with other received signals to derive a first output connected to control the first gate means to pass signals received at the radar frequency in the absence of other over-riding signals; and
  (c) a second channel connected to the receiver means and including means to accept signals therefrom except signals representing the transmitted radar frequency, and including second gate means for coupling said accepted frequencies to the display means, and including means for comparing the relative strengths of signals representing said shifted frequencies with signals of other accepted frequencies to derive a second output connected to control the second gate means to pass signals received at said shifted frequencies in the absence of other over-riding signals accepted in the second channel.

2. In a system as set forth in claim 1, signal combining means coupled to the display means and connected to receive signals passed by said first and second gate means, and signal amplitude control means for independently controlling the magnitudes of signals delivered to the combining means from said gate means.

3. A cooperative radar and frequency-shift reflector system including means for displaying ordinary surface reflection signals and frequency-shifted reflection signals, comprising:
  (a) at least one reflector having means for frequency-shifting and reflecting incident radar signals;
  (b) radar transmitter and receiver means;
  (c) a first channel in the radar connected to the receiver means and including means for comparing the relative instantaneous magnitudes of those received signals representing the transmitted radar frequency with other signals received at other frequencies, and for delivering a first output based on the comparison;
  (d) a first gate controlled by said first output and including means connected to couple the received signals with the displaying means in the absence of other signals of over-riding comparative magnitude;
  (e) a second channel in the radar connected to the receiver means and including means for excluding signals representing the transmitted frequency, and including means for comparing the relative instantaneous magnitudes of shifted-frequency signals with received signals of other frequencies excluding said transmitted frequency, and for delivering a second output based on said comparison; and
  (f) a second gate controlled by said second output and including means connected to couple frequency-shifted signals with said displaying means in the absence of other signals of overriding comparative magnitude.

4. In a system as set forth in claim 3, signal combining means coupled to the displaying means and connected to receive signals passed by said first and second gates, and signal amplitude control means for independently controlling the magnitudes of signals delivered to the combining means from the respective gates.

5. In a system as set forth in claim 3, said means for comparing including multiple-stage saturating amplifiers receiving both desirde-frequency signals and said other signals and at least some of the stages being instantaneously saturated by the momentarily largest of the signals to thereby exclude amplificaiton of the lesser-amplitude signals, and filter means connected to receive and pass selected frequencies among the amplified signals and to deliver said outputs to the gates depending upon the instantaneous presence or absence of said selected frequencies.

6. In a system as set forth in claim 5, said filter means including circuitry for blocking the desired frequencies and passing said other signals which are noise signals and comprise said outputs, the gates being normally conductive and said outputs being connected to block the gates.

7. In a system as set forth in claim 6, an adjustable source of bias for each gate, means coupling said bias to a gate to forward bias the same, the said bias comprising a threshold level which must be exceeded by an output in order for the latter to block the gate.

8. In a system as set forth in claim 3, said means for excluding signals representing the transmitted frequency comprising a filter having a notch in its pass characteristic at the latter frequency, the filter being interposed between said receiver means and the comparing means in the second channel.

No references cited.

RICHARD A. FARLEY, *Primary Examiner.*

M. F. HUBLER, *Assistant Examiner.*